(No Model.)
A. F. MARTEL.
Car Brake.
No. 242,011.          Patented May 24, 1881.
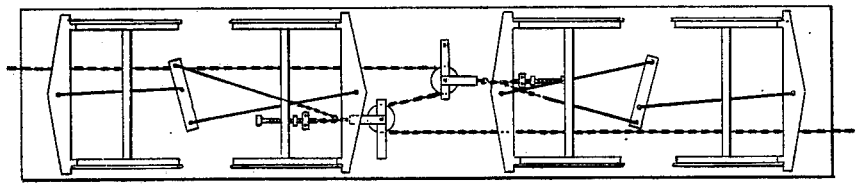
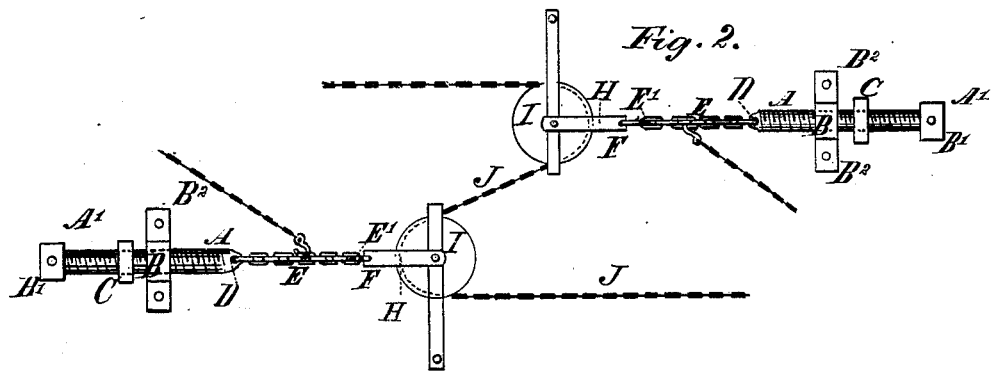
Witnesses:
A. L. Watters
Andrew Hallcett
Inventor:
A. F. Martel
per
Brudeau.
Attorney

UNITED STATES PATENT OFFICE.

ADÉLARD F. MARTEL, OF MONTREAL, QUEBEC, CANADA.

CAR-BRAKE.

SPECIFICATION forming part of Letters Patent No. 242,011, dated May 24, 1881.

Application filed March 25, 1881. (No model.)

*To all whom it may concern:*

Be it known that I, ADÉLARD FRANK MARTEL, of the city of Montreal, in the county of Hochelaga, in the Province of Quebec, Canada, railway-conductor, have invented certain new and useful Improvements in Car-Brakes; and I do hereby declare that the following is a full, clear, and exact description of the same.

My invention has reference to an improvement for gaging and regulating the tension, scope, and action of the pulleys I in bringing the shoes of the brake against the wheels, and also to equalize and distribute the pressure of the braking-power between the cars and the brakes, thus preventing the brake from exerting more power on one car than on another, and also to regulate the tension in proportion to the wear of the shoes.

Figure 1 is a plan of my invention fitted to the bottom of a car. Fig. 2 is an enlarged plan of my regulator in connection with the brake.

A is the bolt, with a square head, having two holes, A', at right angles through its head B'.

B is a nut, bolted to the bottom of the car by lugs B² or any other contrivance to secure it in position. The bolt A is tapped to work on the nut B.

C is a lock-nut to secure the bolt in any required position.

D is an eye or hole in the end of bolt A to secure the chain E, which has a swivel-joint and link, E', of the ordinary kind, to prevent kinking.

F is a hook on the end of chain E, to hook into loop H on the pulley I, through which the braking-chain J is rove.

The operation of my invention is as follows: I diminish or increase the field of action or distance to which the pulley I will be drawn by the braking-chain J by simply screwing the bolt A in or out of the nut B to the required distance for the tension desired and fasten it with the lock-nut C.

What I claim as my invention is—

The bolt A, provided with head B', having holes A' and eye D, the corresponding stationary nut B, and lock-nut C, the chain E, provided with swivel-joint and link E', and hook F, in combination with the loop H and pulley I, the whole arranged as described, and for the purpose set forth.

A. F. MARTEL.

Witnesses:
A. L. WALTERS,
ANDREW HALLETT.